US011802700B2

United States Patent
Chen et al.

(10) Patent No.: US 11,802,700 B2
(45) Date of Patent: Oct. 31, 2023

(54) MODERATE-TO-LOW GLOBAL WARMING POTENTIAL VALUE REFRIGERANT LEAK DETECTION

(71) Applicant: Carrier Corporation, Palm Beach Gardens, FL (US)

(72) Inventors: Lei Chen, South Windsor, CT (US); Richard G. Lord, Murfreesboro, TN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 852 days.

(21) Appl. No.: 16/496,091

(22) PCT Filed: Apr. 4, 2018

(86) PCT No.: PCT/US2018/026053
§ 371 (c)(1),
(2) Date: Sep. 20, 2019

(87) PCT Pub. No.: WO2018/187450
PCT Pub. Date: Oct. 11, 2018

(65) Prior Publication Data
US 2021/0108819 A1    Apr. 15, 2021

Related U.S. Application Data

(60) Provisional application No. 62/482,425, filed on Apr. 6, 2017.

(51) Int. Cl.
*F24F 11/36* (2018.01)
*F24F 11/77* (2018.01)
(Continued)

(52) U.S. Cl.
CPC .............. *F24F 11/36* (2018.01); *F24F 11/30* (2018.01); *F24F 11/77* (2018.01); *F24F 11/89* (2018.01); *G01N 21/3504* (2013.01)

(58) Field of Classification Search
CPC .. F24F 11/36; F24F 11/77; F24F 11/89; F24F 11/30; F24F 2110/50; F24F 2110/66;
(Continued)

(56) References Cited

U.S. PATENT DOCUMENTS 4,199,101 A  *  4/1980  Bramow  .............. G05D 23/185
                                                          236/13
4,333,316 A  *  6/1982  Stamp, Jr.  ................ F24F 11/66
                                                          236/51
(Continued)

FOREIGN PATENT DOCUMENTS

CA          2593975 A1  *  7/2006  ......... G01N 27/4045
CA          2611024 A1  *  12/2006  ......... G01N 21/3504
(Continued)

OTHER PUBLICATIONS

ASHRAE position on Ammonia as a refrigerant Jan. 17, 2002 (Year: 2002).*
(Continued)

*Primary Examiner* — Edelmira Bosques
*Assistant Examiner* — Frances F. Hamilton
(74) *Attorney, Agent, or Firm* — CANTOR COLBURN LLP

(57) ABSTRACT

An air conditioning system is provided and includes a unit receptive of refrigerant having a moderate-to-low global warming potential (GWP) value for thermal interaction with a fluid, an enclosure, a fan disposed and configured for urging a flow of the fluid through the unit, a refrigerant detection sensor and a controller. The refrigerant detection sensor is disposed in the enclosure to be operable in a first mode in which a baseline response is established and a second mode in which refrigerant leak detection is executed based on the baseline response. The refrigerant detection sensor is further configured to generate a binary output of
(Continued)

leak and non-leak signals in accordance with a result of the refrigerant leak detection. The controller is configured to control operations of the fan and the vent based on the binary output.

13 Claims, 6 Drawing Sheets

(51) Int. Cl.
*F24F 11/89* (2018.01)
*G01N 21/3504* (2014.01)
*F24F 11/30* (2018.01)

(58) Field of Classification Search
CPC .... G01N 21/3504; G01N 21/53; G01N 21/55; G01N 21/274; G01N 15/1435; G01N 27/4074
USPC ........................................ 454/256; 700/276
See application file for complete search history.

(56) References Cited

U.S. PATENT DOCUMENTS

| | | | | |
|---|---|---|---|---|
| 4,420,687 | A * | 12/1983 | Martinez et al. | G01N 21/3504 250/343 |
| 4,458,841 | A * | 7/1984 | Laakaniemi | F15B 13/086 137/884 |
| 4,480,783 | A * | 11/1984 | Clark | F24F 11/77 236/82 |
| 4,497,031 | A * | 1/1985 | Froehling | F24F 11/63 165/212 |
| 4,533,080 | A * | 8/1985 | Clark | G05D 23/1917 236/49.3 |
| 4,616,325 | A * | 10/1986 | Heckenbach | F24F 11/63 165/223 |
| 4,906,978 | A * | 3/1990 | Best | G08B 17/107 340/630 |
| 5,477,913 | A * | 12/1995 | Polk | F24F 11/30 126/116 A |
| 5,555,509 | A * | 9/1996 | Dolan | F24F 11/63 236/51 |
| 6,073,455 | A | 6/2000 | Tachigori et al. | |
| 6,157,033 | A | 12/2000 | Chudnovsky | |
| 6,201,245 | B1 * | 3/2001 | Schrader | G01N 21/3504 250/353 |
| 6,373,056 | B1 | 4/2002 | Johnson et al. | |
| 6,396,056 | B1 * | 5/2002 | Lord | G01N 21/3504 250/252.1 |
| 6,426,703 | B1 * | 7/2002 | Johnston | G08B 21/14 340/630 |
| 6,471,136 | B1 * | 10/2002 | Chatterjee | F25D 17/042 237/2 B |
| 6,644,047 | B2 | 11/2003 | Taira et al. | |
| 6,772,598 | B1 | 8/2004 | Rinehart | |
| 7,022,993 | B1 | 4/2006 | William et al. | |
| 8,548,271 | B2 | 10/2013 | Grimberg | |
| 9,513,204 | B2 | 12/2016 | Paul et al. | |
| 9,746,199 | B1 * | 8/2017 | Drees | F24F 11/76 |
| 10,060,645 | B2 * | 8/2018 | Yamaguchi | F24F 11/30 |
| 10,274,219 | B2 * | 4/2019 | Makino | F24F 11/36 |
| 10,408,484 | B2 * | 9/2019 | Honda | F24F 11/76 |
| 10,753,631 | B2 * | 8/2020 | Ikawa | F24F 11/36 |
| 11,067,303 | B2 * | 7/2021 | Obara | F24F 1/0007 |
| 2002/0178738 | A1 * | 12/2002 | Taira | F24F 11/89 62/181 |
| 2005/0211949 | A1 | 9/2005 | Bivens | |
| 2007/0034792 | A1 * | 2/2007 | Zhang | G01N 21/3504 250/252.1 |
| 2008/0003649 | A1 * | 1/2008 | Maltezos | B01L 3/50851 435/286.1 |
| 2008/0277586 | A1 | 11/2008 | Cardinale | |
| 2010/0244863 | A1 * | 9/2010 | Sasaki | F25B 49/005 324/694 |
| 2011/0042570 | A1 * | 2/2011 | Wong | G01N 21/3504 250/343 |
| 2013/0213068 | A1 | 8/2013 | Goel et al. | |
| 2014/0214214 | A1 * | 7/2014 | Asmus | F24F 11/62 702/183 |
| 2014/0266755 | A1 | 9/2014 | Arensmeier et al. | |
| 2014/0361173 | A1 | 12/2014 | Kuester et al. | |
| 2015/0028209 | A1 | 1/2015 | Harju et al. | |
| 2016/0178229 | A1 | 6/2016 | Chen et al. | |
| 2016/0215996 | A1 * | 7/2016 | Blair | F24F 11/58 |
| 2016/0245566 | A1 * | 8/2016 | Hiraki | F24F 11/77 |
| 2016/0370799 | A1 * | 12/2016 | Denton | G05B 23/0262 |
| 2017/0089597 | A1 * | 3/2017 | Mueller | G05B 15/02 |
| 2017/0277209 | A1 * | 9/2017 | Kurokawa | F24F 11/63 |
| 2018/0073762 | A1 * | 3/2018 | Yajima | F24F 11/89 |
| 2018/0094844 | A1 * | 4/2018 | Suzuki | F25B 13/00 |
| 2018/0259235 | A1 * | 9/2018 | Delgoshaei | F25B 49/02 |
| 2018/0283725 | A1 * | 10/2018 | Ikawa | F24F 1/0083 |
| 2019/0170604 | A1 * | 6/2019 | Kester | F25B 49/005 |
| 2020/0072508 | A1 * | 3/2020 | Uraguchi | F25B 49/02 |
| 2020/0393140 | A1 * | 12/2020 | Nouchi | F25B 49/02 |
| 2021/0190353 | A1 * | 6/2021 | Blanton | F24F 11/77 |

FOREIGN PATENT DOCUMENTS

| | | | | |
|---|---|---|---|---|
| CA | 2729459 | A1 * | 1/2010 | G01J 3/02 |
| CA | 2950316 | C * | 9/2020 | G01N 21/3504 |
| CN | 101516658 | A | 8/2009 | |
| CN | 102762976 | A | 10/2012 | |
| CN | 203275050 | U | 11/2013 | |
| CN | 105277501 | A | 1/2016 | |
| CN | 106016450 | A | 10/2016 | |
| CN | 109191759 | A * | 1/2019 | G08B 17/117 |
| DE | 102014016515 | A1 * | 5/2016 | G01J 3/42 |
| EP | 1900557 | A2 * | 3/2008 | B60H 1/00428 |
| EP | 3179233 | A1 * | 6/2017 | G01J 3/0235 |
| GB | 2314153 | A * | 12/1997 | F23N 5/242 |
| JP | 08200904 | A * | 8/1996 | F24F 11/36 |
| JP | 08200904 | A | 8/1996 | |
| JP | H09324928 | A | 12/1997 | |
| JP | 3291407 | B2 | 6/2002 | |
| JP | 2016176648 | A | 10/2016 | |
| JP | 2016196996 | A | 11/2016 | |
| KR | 101722103 | B1 * | 3/2017 | F24F 11/36 |
| WO | 9833056 | A1 | 7/1998 | |
| WO | WO-2013038599 | A1 * | 3/2013 | F24F 1/0007 |
| WO | 2015072345 | A1 | 5/2015 | |
| WO | WO-2016029005 | A1 * | 2/2016 | G01N 27/4045 |
| WO | 2017009819 | A1 | 1/2017 | |
| WO | 2017083613 | A1 | 5/2017 | |

OTHER PUBLICATIONS

ASHRAE position on Refrigerants and their responsible use Jun. 27, 2018 (Year: 2018).*
Honeywell, "Mechanical Equipment Rooms", 2011, 12 pages.
ISR/WO, Issued Sep. 13, 2018, PCT Application No. PCT/US2018/026053, 23 pages total.
IPRP, Mailed Oct. 17, 2019, p. 13.

* cited by examiner

MODERATE-TO-LOW GLOBAL WARMING POTENTIAL VALUE REFRIGERANT LEAK DETECTION

CROSS-REFERENCE TO RELATED APPLICATIONS

This application claims the benefit of PCT/US2018/026053 filed Apr. 4, 2018, which claims priority to U.S. Provisional Application No. 62/482,425 filed Apr. 6, 2017, which is incorporated herein by reference in their entirety.

BACKGROUND

The following description relates to moderate-to-low global warming potential (GWP) value refrigerant leak detection and, more particularly, to a controllable moderate-to-low GWP value refrigerant leak detector and a method of operating the same.

Air conditioning systems for residential or commercial buildings typically include an outdoor unit and an indoor unit. The outdoor unit drives airflow into the indoor unit where that airflow is cooled by thermal interaction with a refrigerant. This refrigerant, historically, has been provided as a fluid with a high global warming potential (GWP) value such as R134A or R410A. Thus, although the refrigerants that have been used previously are effective coolants, the negative effect they can have on the environment has led to the institution of requirements that new refrigerants which have moderate-to-low GWP values be employed instead.

Moderate-to-low GWP value refrigerants (i.e., A2L) can be mildly flammable, however, and thus their use in air conditioning systems can present a fire risk that needs to be addressed. In particular, to the extent that refrigerant leaks are possible in air conditioning systems, the use of moderate-to-low GWP value refrigerants makes the use of refrigerant leak detectors mandatory especially for indoor units of ducted residential heating, ventilation and air conditioning (HVAC) products and other similar systems. To this end, while commercial non-dispersive infrared (NDIR) sensors are available, they can be unacceptably expensive due to their optical and electronic components accounting for approximately 40-60% of the costs and generally being over-designed for leak detection applications.

That is, while the optical and electronic components of NDIR sensors are usually designed to accurately determine gas concentrations for demand based ventilation, greenhouse applications, etc., leak detection sensing requires only that the presence of refrigerant arising from leakage be detected and does not need an accurate determination of a concentration of such refrigerant.

BRIEF DESCRIPTION

According to one aspect of the disclosure, an air conditioning system is provided and includes a unit receptive of refrigerant having a moderate-to-low global warming potential (GWP) value for thermal interaction with a fluid, an enclosure, a fan disposed and configured for urging a flow of the fluid through the unit, a refrigerant detection sensor and a controller. The refrigerant detection sensor is disposed in the enclosure to be operable in a first mode in which a baseline response is established and a second mode in which refrigerant leak detection is executed based on the baseline response. The refrigerant detection sensor is further configured to generate a binary output of leak and non-leak signals in accordance with a result of the refrigerant leak detection. The controller is configured to control operations of the fan and the vent based on the binary output.

In accordance with additional or alternative embodiments, the refrigerant detection sensor is disposed proximate to a pooling region of the enclosure.

In accordance with additional or alternative embodiments, the refrigerant detection sensor includes a detection assembly and an actuation assembly receptive of a signal from the detection assembly and configured for generation of the binary output based on the signal and for issuance of the binary output to the controller.

In accordance with additional or alternative embodiments, the detection assembly includes an emitter, a detector, an optical element to reflect radiation emitted by the emitter toward the detector such that the radiation passes through an elongate section of the enclosure and a band pass filter disposed along a radiation pathway between the emitter and the detector.

In accordance with additional or alternative embodiments, the detection assembly is configured to detect multiple types of the refrigerant.

In accordance with additional or alternative embodiments, the detection assembly further includes a flow driving element.

In accordance with additional or alternative embodiments, the actuation assembly includes an analog-to-binary output conversion circuit.

In accordance with additional or alternative embodiments, the intermittent baseline calibration includes establishing a baseline response of the refrigerant detection sensor to an execution of leak detection.

In accordance with additional or alternative embodiments, the refrigerant detection sensor recalibrates at certain times and/or at predefined intervals.

In accordance with additional or alternative embodiments, the refrigerant detection sensor executes diagnostics at the certain times and/or the predefined intervals.

In accordance with additional or alternative embodiments, the leak detection includes an iterative determination that a concentration of the refrigerant in a sample drawn from the enclosure exceeds first or second thresholds defined in accordance with the most recent recalibration, a setting of the binary output to correspond to the leak signal in an event the concentration exceeds either of the first or second thresholds and a setting of the binary output to correspond to the non-leak signal in an event the concentration does not exceed either of the first or second thresholds.

In accordance with additional or alternative embodiments, the controller activates the fan for extended or abbreviated periods of time and opens the vent based on the binary output corresponding to the leak signal and in the event the concentration exceeds either of the first or second thresholds, respectively, and deactivates the fan and closes the vent based on the binary output corresponding to the non-leak signal.

In accordance with additional or alternative embodiments, the controller includes a relay electrically interposed between the refrigerant detection sensor and the fan and the vent.

According to another aspect of the disclosure, a controllable moderate-to-low global warming potential (GWP) value refrigerant leak detector is provided. The controllable moderate-to-low GWP value refrigerant leak detector includes a detection assembly. The detection assembly includes an emitter, a detector, an optical element to reflect radiation emitted by the emitter toward the detector such that the radiation passes through an elongate section of an enclosure and a band pass filter disposed along a radiation pathway between the emitter and the detector. The band pass filter is tuned for detection of the moderate-to-low GWP value refrigerant. The detector is receptive of a portion of the radiation passing through the band pass filter. The controllable moderate-to-low GWP value refrigerant leak detector further includes an actuation assembly receptive of a signal, which is reflective of a magnitude of the portion of the radiation, from the detector and configured for generation of a binary output based on the signal and for issuance of the binary output to a fan/vent controller.

According to yet another aspect of the disclosure, a method of operating an air conditioning system that includes a refrigerant detection sensor configured to execute leak detection with respect to leakage of refrigerant having a moderate-to-low global warming potential (GWP) value into an enclosure is provided. The method includes recalibrating the refrigerant detection sensor, setting the refrigerant detection sensor to a detection mode, iteratively determining, at the refrigerant detection sensor, that a concentration of the refrigerant in a sample drawn from the enclosure exceeds a threshold defined in accordance with a most recent recalibration, setting a binary output of the refrigerant detection sensor to correspond to leak or non-leak signals in an event the concentration exceeds or does not exceed the threshold, respectively, and mitigating the leakage of the refrigerant based on the binary output corresponding to the leak signal.

In accordance with additional or alternative embodiments, the refrigerant detection sensor includes a detection assembly and an actuation assembly receptive of a signal from the detection assembly and configured for generation of the binary output based on the signal and for issuance of the binary output to the controller.

In accordance with additional or alternative embodiments, the detection assembly includes an emitter, a detector, an optical element to reflect radiation emitted by the emitter toward the detector such that the radiation passes through an elongate section of the enclosure and a band pass filter disposed along a radiation pathway between the emitter and the detector.

In accordance with additional or alternative embodiments, the detection assembly is configured to detect multiple types of the refrigerant.

In accordance with additional or alternative embodiments, the method further includes executing diagnostics at the predefined intervals.

In accordance with additional or alternative embodiments, the mitigating includes activating a fan and opening a vent based on the binary output corresponding to the leak signal and deactivating the fan and closing the vent based on the binary output corresponding to the non-leak signal.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

As will be described below, a refrigerant detection sensor is provided. The refrigerant detection sensor produces discrete, such as binary signals that are indicative of refrigerant leak and non-leak conditions, including warning conditions by tracking a differential intensity of radiation (e.g., infrared (IR) radiation) that is received by a detector relative to a known baseline state. The refrigerant detection sensor includes a source or emitter, a band pass filter, a detector and a circuit (e.g., a step function circuit, a monostable circuit, 1-shot circuit or another similar type of circuit) that operates by converting a continuous analog output to discrete output, including a binary output. The band pass filter can be tuned to target key refrigerants while the emitter can be a broad bandwidth IR source or an integrated broad bandwidth source. A main controller of the air conditioning unit comprising a relay receives output from the circuit for activating a fan or blower to circulate air for ventilating and diluting leaked refrigerant. Moreover, a baseline reading of the detector can be refreshed so that the sensor can operate without calibration even though the emitter degrades over time.

Figure 1:
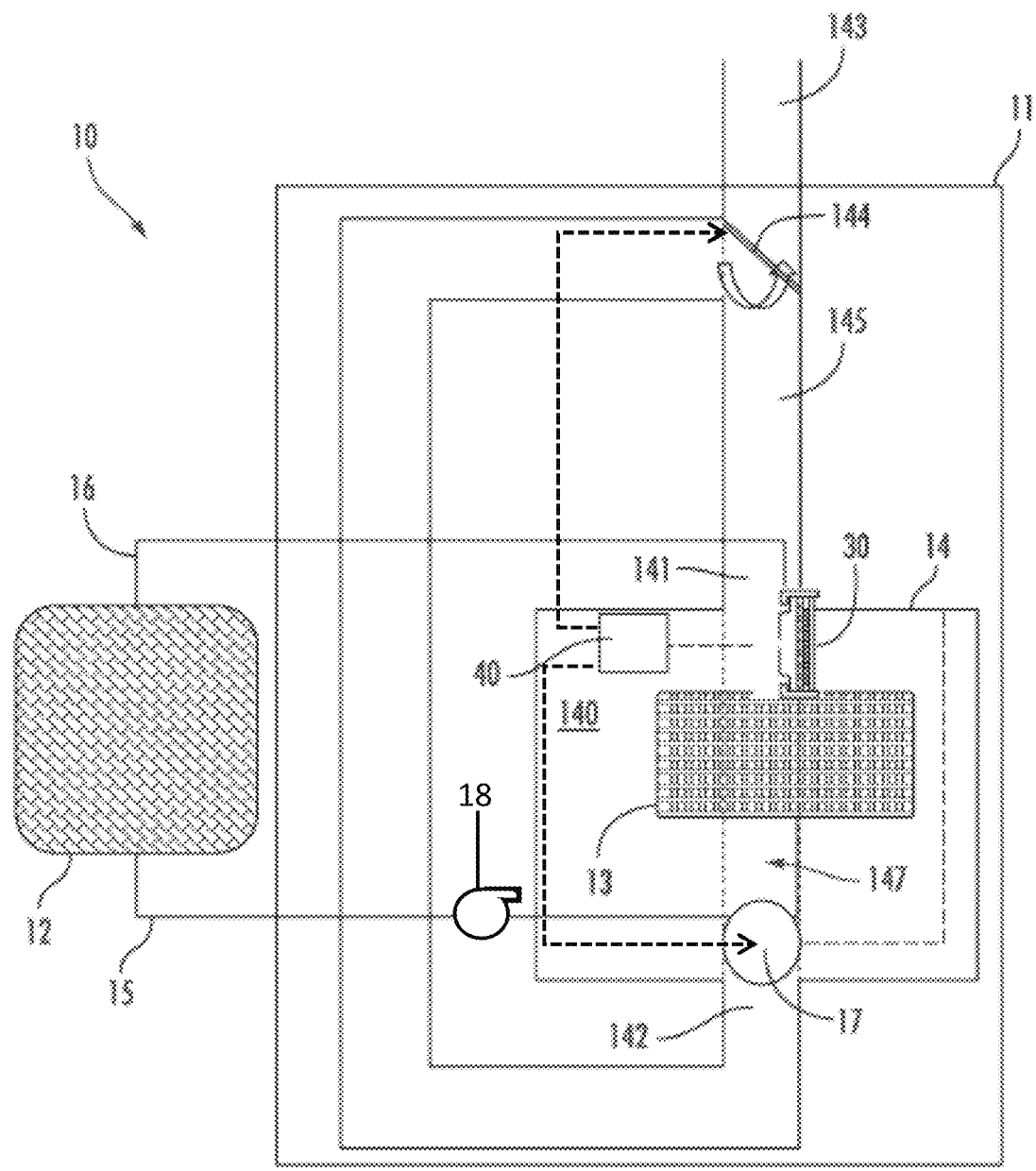
FIG. 1 is a schematic illustration of an air conditioning system in accordance with embodiments.
Figure 2:
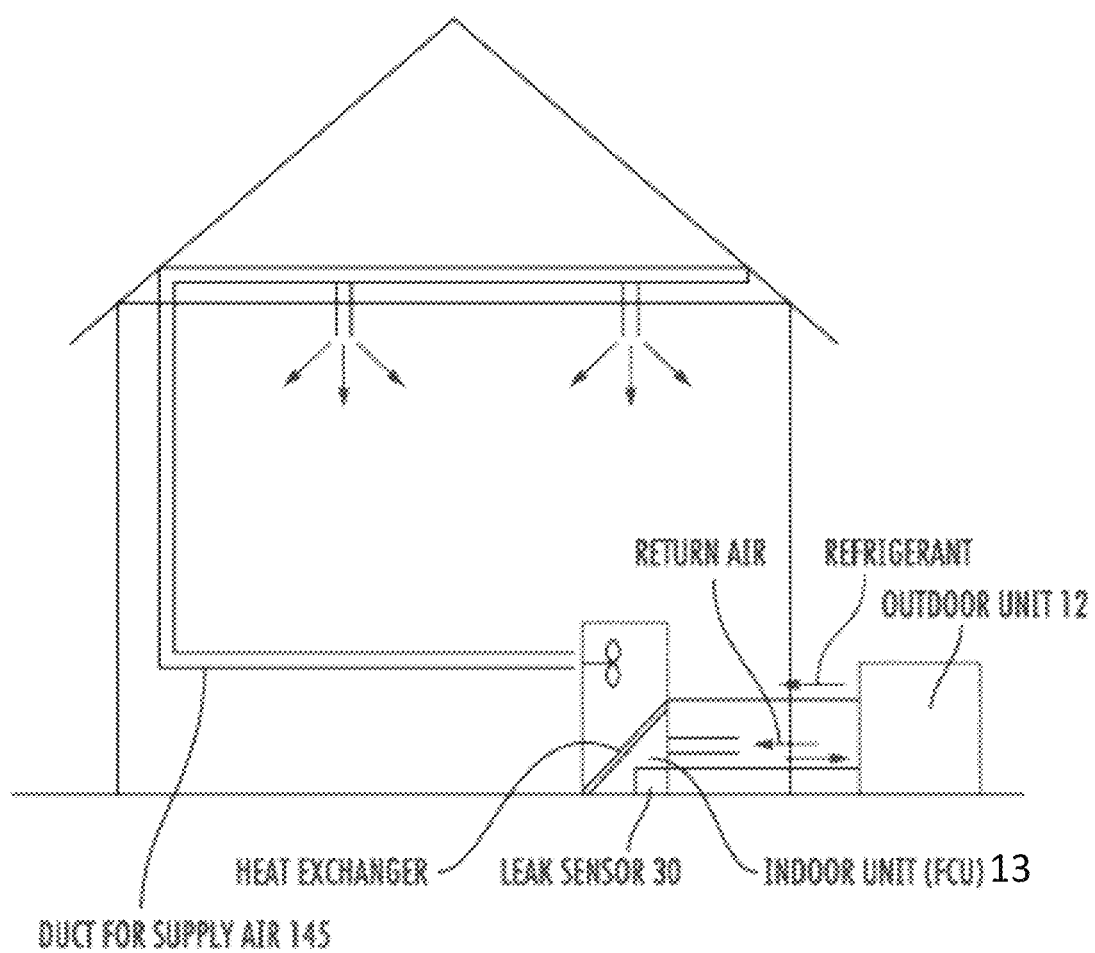
FIG. 2 is a schematic illustration of an air conditioning system in accordance with alternative embodiments.
Figure 3:
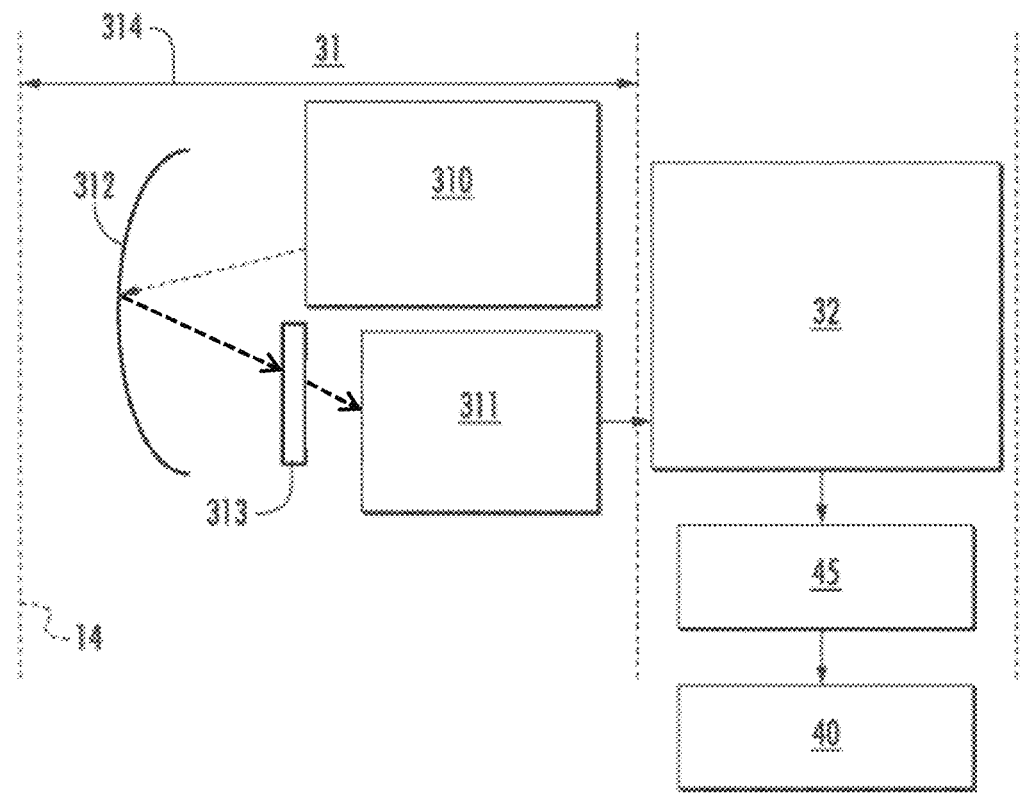
FIG. 3 is a schematic illustration of a controllable moderate-to-low global warming potential (GWP) value refrigerant leak detector for use with the air conditioning system of FIG. 1 (or FIG. 2) in accordance with embodiments.

With reference to FIGS. 1, 2 and 3, an air conditioning system 10 is provided for use with a building 11, such as a residence or commercial building, and may be configured as a ductless or ducted system. For purposes of clarity and brevity, however, the following description will relate to the exemplary case of the air conditioning system 10 being a ducted system. More specifically, the leak detection sensor is disposed in a location of the fan coil unit (FCU) where refrigerant leaking from the system can pool due to a higher density than air as illustrated in FIG. 2.

Thus, as shown in FIGS. 1, 2 and 3, the air conditioning system 10 includes an outdoor unit 12 that is disposed at an exterior of the building 11, an indoor unit 13 that includes an evaporator and is disposed in an interior of the building 11 and an enclosure 14. The outdoor unit 12 includes a fan and a condenser, which is fluidly coupled to the evaporator of the indoor unit 13 by way of input piping 15 and return piping 16. The condenser, the evaporator (i.e., fan coil unit), the input piping 15 and the return piping 16 cooperatively form a refrigerant circuit for, in this case, moderate-to-low GWP value refrigerant (e.g., R32).

During operations of the refrigerant circuit, the fan of the outdoor unit 12 blows air over the condenser to remove heat from the refrigerant to eject heat and cause refrigerant vapor to condense to liquid. The cooled liquid refrigerant is then pumped through the input piping 15 toward the indoor unit 13 by pump 18, which is operably disposed on the input piping 15, whereupon the cooled refrigerant in the FCU evaporates, cooling the air passing through the FCU. Cool air is then circulated into occupied space for human comfort. Multiple FCUs can be installed in individual rooms to space temperature conditioning. Refrigerant can potentially leak into the occupied space through the FCUs or pipes. Likewise, refrigerant can leak into air duct and accumulate in an area that can potential contain an ignition source. These rare events could lead to undesirable consequences such as fire hazard and causing damages to properties.

The enclosure 14 includes a main section 140 that surrounds the indoor unit 13 and has an outlet 141 and a return air duct 142, an optional vent 143 that is opened and closed by a damper 144 and a conditioned air duct 145. During normal cooling operation, conditioned air is supplied to the occupied space through conditioned air duct 145. Return air is circulated partially or fully through the return air duct 142 to sustain desired operation. Under rare events of refrigerant leak substantial to cause hazardous conditions, such as those exceeding 25% low flammable limit (LFL), air circulation is activated to dilute the refrigerant in the building or air is directed to exit the building via damper 144 to the outdoor environment. Damper 144 is engaged based on the leak detection device response and resulting hazardous conditions for minimize the risk. Specifically, if dilution within the building is deemed insufficient for mitigating the flammability risk or combustion of refrigerant has occurred, venting to the outside is the best option.

With continued reference to FIGS. 1, 2 and 3, the air conditioning system 10 further includes a fan 17, a refrigerant detection sensor 30 and a controller 40. The fan 17 may be provided as a fan-coil unit of the evaporator and is disposed and configured for supplying air to the occupied space of the building 11. The refrigerant detection sensor 30 is disposed in the enclosure 14 and, in some cases, along the sample duct 147 and is configured for operation in first and second modes. In the first mode, the refrigerant detection sensor 30 intermittently executes a calibration or recalibration process by which the refrigerant detection sensor 30 establishes a baseline response for itself to tests run on sample drawn from the sample duct 147. In the second mode, the refrigerant detection sensor 30 executes leak detection operations with respect to a presence of refrigerant in samples drawn from the sample duct 147. The leak detection operations are thus based on comparisons between responses of the refrigerant detection sensor 30 and the baseline response in accordance with a most recent recalibration. When operating in the second mode, the refrigerant detection sensor 30 is further configured for providing a binary output of leak and non-leak signals. The controller 40 of the air conditioner is configured to control operations of the fan 17, the vent 143 and the damper 144 based on the binary output of the refrigerant detection sensor 30 that is physically wired to the controller or communicates with the controller via wired or wireless communication. The structural details of at least the refrigerant detection sensor 30 and the controller 40 and their various respective functions and operations will be described in greater detail below.

As shown in FIG. 3, the refrigerant detection sensor 30 includes an optical detection assembly 31 and supporting electronics and associated firmware 32.

The detection assembly 31 includes an emitter 310, a detector 311, an optical element 312 and a band pass filter 313. The emitter 310 may be provided as a broad wavelength emitter of electro-magnetic radiation or as a narrow band emitter of electro-magnetic radiation at specific wavelengths (e.g., 2.8 to 3.2 microns for refrigerant R32, difluoromethane). In either case, the electro-magnetic radiation may be IR radiation and, for purposes of clarity and brevity, the following description will relate to this exemplary case. The detector 311 may be provided as an IR detector, such as a thermopile or another similar device. The optical element 312 may be provided as a mirror or specular surface and is disposed and configured to reflect the IR radiation emitted by the emitter 310 toward the detector 311 such that the IR radiation passes through an elongate section 314 of the enclosure 14. The band pass filter 313 is disposed along an IR radiation pathway between the emitter 310 and the detector 311 and serves to filter out IR radiation signals that are not associated with the response of the moderate-to-low GWP value refrigerant to the IR radiation emitted by the emitter 310 while allowing IR radiation signals that are associated with the response of the moderate-to-low GWP value refrigerant to the IR radiation emitted by the emitter 310 to propagate to the detector 311. The band pass filter 313 may be provided as a glass window and may be disposed proximate to the emitter 310 (i.e., upstream from the optical element 312) or proximate to the detector 311 (i.e., downstream from the optical element 312).

With the construction described above and illustrated in FIG. 3, the radiation pathway provided by the optical element 312 is substantially longer than it otherwise could be given the width of the enclosure 14. That is, since the radiation pathway has a forward component from the emitter 310 to the optical element 312 and a reverse component from the optical element 312 to the detector 311, the radiation pathway is actually twice as long as it would be without the optical element 312. This additional length provides for additional exposure of the moderate-to-low GWP value refrigerant to the IR radiation emitted by the emitter 310 and thus a greater and more reliable response of the detector 311.

Figure 4:
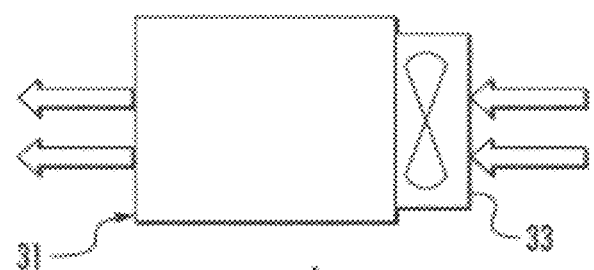
FIG. 4 is a perspective view of a refrigerant detection sensor with its own mini-fan attached in accordance with embodiments.

With reference to FIG. 4, the detection assembly 31 may further include a flow driving element 33. The flow driving element 33 may include a fan element, as shown in FIG. 4, a heating element or another similar device. In any case, the flow driving element 33 draws air through the detection assembly 31 and can serve to dilute impurities or refrigerants for establishing baseline responses and to improve historical tracking for calibration.

Figure 5:
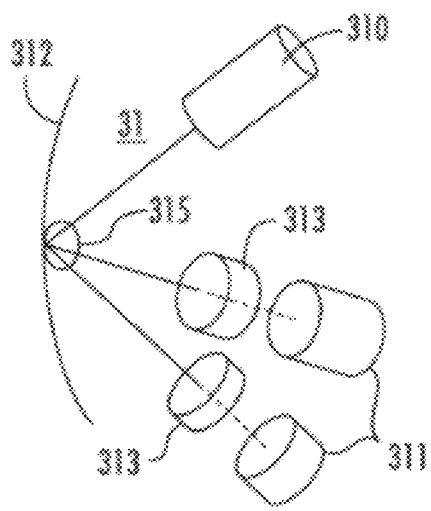
FIG. 5 is a schematic illustration of a controllable moderate-to-low global warming potential (GWP) value refrigerant leak detector for use with the air conditioning system of FIG. 1 in accordance with further embodiments.
Figure 6:
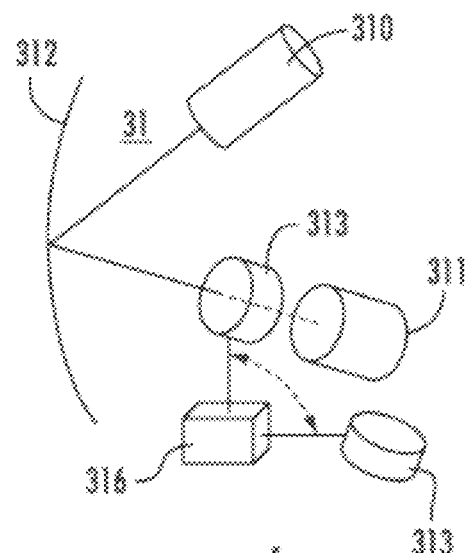
FIG. 6 is a schematic illustration of a controllable moderate-to-low global warming potential (GWP) value refrigerant leak detector for use with the air conditioning system of FIG. 1 (or FIG. 2) in accordance with further embodiments.

With reference to FIGS. 5 and 6, the detection assembly 31 may be configured to detect one type of the moderate-to-low GWP value refrigerant as shown in FIG. 3 or multiple types of the moderate-to-low GWP value refrigerant. For example, as shown in FIG. 5, a beam splitter 315 could be disposed along the IR radiation pathway to split the IR radiation into at least first and second beam components directed through corresponding first and second band pass filters 313 and toward corresponding first and second detectors 311. Here, the first and second band pass filters 313 may be configured to allow IR radiation of different wavelengths to pass through to the first and second detectors 311 so that IR radiation signals that are associated with the response of multiple moderate-to-low GWP value refrigerants to the IR radiation emitted by the emitter 310 are allowed to propagate to the first and second detectors 311. Meanwhile, as shown in FIG. 6, a switching element 316 could be disposed to manually or automatically switch one band pass filter 313 for another so that a type of a moderate-to-low GWP value refrigerant being detected could be correspondingly switched to another type.

Figure 10:
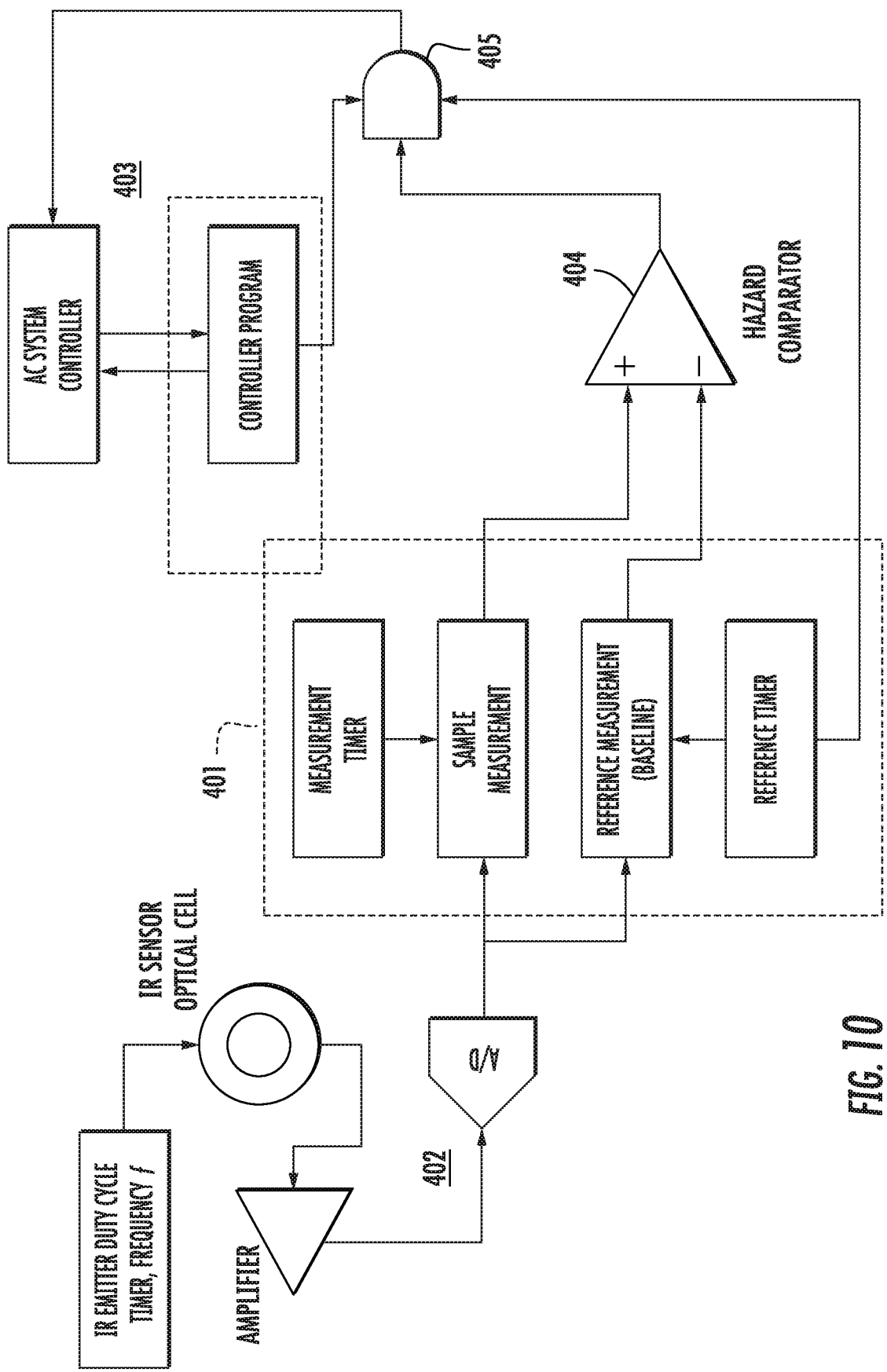
FIG. 10 is a schematic diagram of components and constituent logic embedded in the leak detection device in the form of firmware coded in its own programmed integrated circuit (PTC) independent of a controller of the air conditioning system of FIG. 1 (or FIG. 2) in accordance with further embodiments.

With reference back to FIG. 3, the detector (or detectors) 311 receives IR radiation signals whose spectra are reflective of either a refrigerant leak condition or a refrigerant non-leak condition. In both cases, the detector 311 issues signals corresponding to the refrigerant leak or non-leak conditions to the supporting electronics and associated firmware 32. The supporting electronics and associated firmware 32 is receptive of these signals and is configured for generation of the binary output based thereon and for issuance of the binary output to the controller 40 by way of relay 45. The supporting electronics and associated firmware 32 may include an analog-to-binary output conversion circuit or, more particularly, a step function circuit, a monostable circuit, a 1-shot circuit or another similar type of circuit. A particular design of the supporting electronics and associated firmware 32 is illustrated in FIG. 10.

In accordance with embodiments, in an event the detector (or detectors) 311 receives an IR radiation signal whose spectrum is reflective of a refrigerant leak condition, the detector 311 issues signals corresponding to the refrigerant leak condition to the supporting electronics and associated firmware 32 and the supporting electronics and associated firmware 32 generates a binary output "1" for issuance to the controller 40 so that mitigation efforts can be activated. Conversely, in an event the detector (or detectors) 311 receives an IR radiation signal whose spectrum is reflective of a refrigerant non-leak condition, the detector 311 issues signals corresponding to the refrigerant non-leak condition to the supporting electronics and associated firmware 32 and the supporting electronics and associated firmware 32 generates a binary output "0" for issuance to the controller 40 so that mitigation efforts can be deactivated or maintained in a deactivated state. As such, since the binary output is all that is needed to be issued to the controller 40, the detection assembly 31 and the supporting electronics and associated firmware 32 need not include complex optical or electronic components that evaluate a concentration of the leaked or non-leaked refrigerant in the enclosure 14.

Figure 7:
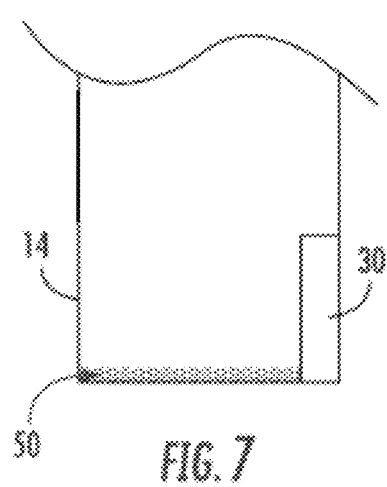
FIG. 7 is a side view of an enclosure of an indoor unit of the air conditioning system of FIG. 1 (or FIG. 2) in accordance with embodiments.
Figure 8:
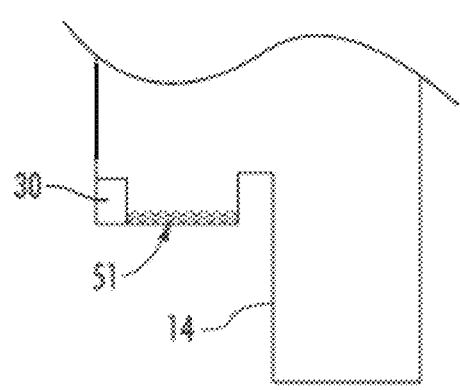
FIG. 8 is a side view of an enclosure of an indoor unit of the air conditioning system of FIG. 1 (or FIG. 2) in accordance with alternative embodiments.

With reference to FIGS. 7 and 8, the refrigerant detection sensor 30 may be disposed in or close to a pooling region 50 of the enclosure 14. This pooling region 50 may be defined at or close to a lowest region in an interior of the enclosure 14 (see FIG. 7) or to an elevated section 51 of the interior of the enclosure 14 where liquids and/or vapor tend to accumulate and pool together (see FIG. 8).

The refrigerant detection sensor 30 may be configured to operate on its own or the controller 40 may be configured to operate the refrigerant detection sensor 30. In either case, the intermittent baseline calibration of the refrigerant detection sensor 30 includes an establishment of a baseline response of the refrigerant detection sensor 30 to an execution of leak detection at certain times (e.g., when components of the air conditioning system 10 are activated, when the indoor unit 13 is activated, when the fan 20 is activated) and/or at predefined intervals. The self-calibration of sensor 30 may be conducted at the wavelength utilized for refrigerant leak detection or at a different wavelength enabled by a second band-path filter, for instance the wavelength at which carbon dioxide has detectable absorption. In any case, since it is expected that the refrigerant detection sensor 30 might degrade over time, the intermittent baseline calibration of the refrigerant detection sensor 30 allows the detection assembly 31 and the supporting electronics and associated firmware 32 to continue to operate reliably. In accordance with further embodiments, however, the refrigerant detection sensor 30 may execute (on its own or in response to commands issued by the controller 40) diagnostics at the certain times and/or the predefined intervals.

A method of operating the above-described air conditioning system 10 is also provided. The method includes intermittently recalibrating the refrigerant detection sensor 30 at the certain times and/or the predefined intervals, setting the refrigerant detection sensor to a detection mode and iteratively determining, at the refrigerant detection sensor 30, that a concentration of the refrigerant in a sample drawn from the enclosure 14 exceeds a threshold defined in accordance with the most recent recalibration of the refrigerant detection sensor 30. The method further includes setting a binary output of the refrigerant detection sensor to correspond to a leak signal in an event the concentration exceeds the threshold or a non-leak signal in an event the concentration does not exceed the threshold and either mitigating the leakage of the refrigerant based on the binary output corresponding to the leak signal or halting the mitigation.

In accordance with embodiments, the mitigating of the leakage of the refrigerant includes an activation of the fan 17 and an opening of the vent 143 by the damper 144, which can be optional for some systems. Here, fluid (e.g., air) that is blown by the fan 17 mixes with the leaked refrigerant and drives the leaked refrigerant out of the building 11 via the vent 143. In so doing, the mitigation efforts reduce the risk of fire due to the refrigerant, which in this case is mildly flammable, remaining in the building 11. Conversely, the halting of the mitigation includes a deactivation of the fan 17 and a closing of the vent 143 by the damper 144. A variant of this embodiment can achieve the same mitigation results without having a damper by circulating air within a house or building to dilute the refrigerant that accumulates in the duct or any confined space. This is applicable when the concentration of refrigerant when fully dispersed in the build will lead to non-flammable situation, i.e. less than the lower flammable limit (LFL) or even more strictly less than 25% LFL.

Figure 9:
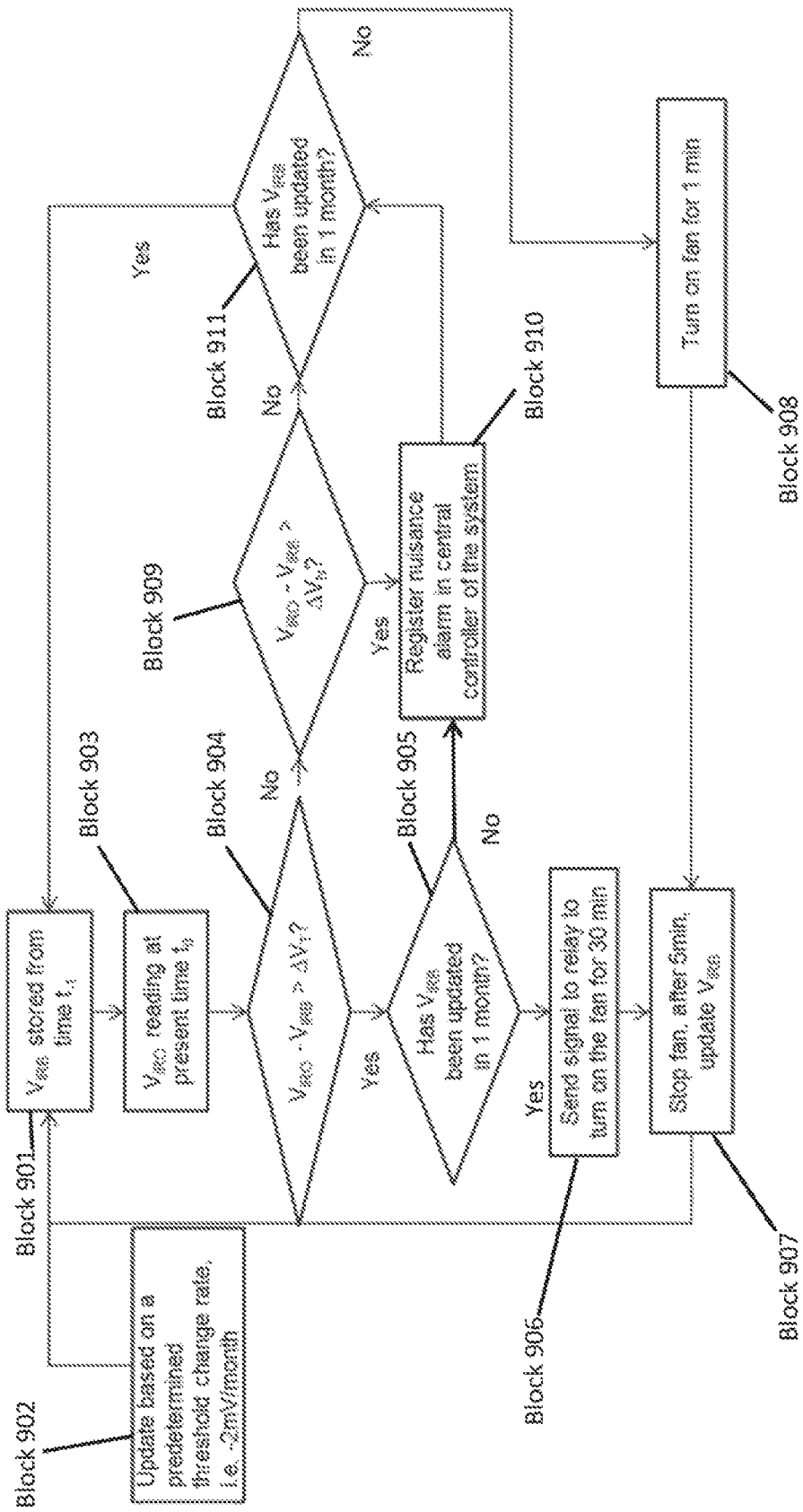
FIG. 9 is a flow diagram illustrating a method of operating an optical sensor of the controllable moderate-to-low global warming potential (GWP) value refrigerant leak detector of FIG. 3.

With reference to FIG. 9, a further method of operating the above-described air conditioning system 10 is provided. As shown in FIG. 9, in an initial operation, an output $V_{IRB}$ of the detector 311 is stored (block 901) having been updated based on a predetermined threshold change rate such as −2 mV/month (block 902). Subsequently, a present reading of the output $V_{IRO}$ of the detector 311 is taken (block 903) and it is determined whether a difference between the two outputs exceed a threshold output change of a detector 311 for activating the fan 17 in the event of a refrigerant leak $\Delta V_T$ (block 904). If this difference exceeds the threshold output change $\Delta V_T$, a signal is sent to the relay 45 and then to the system controller 40 such that the fan 17 is tuned on for a given extended period of time (block 906) and then turned off (block 907). If the difference does not exceed the threshold output change $\Delta V_1$ but still exceeds a nuisance alarm threshold $\Delta V_N$ (block 909), a nuisance alarm is registered by controller 40 (block 910) and it is again determined whether the output $V_{IRB}$ has been updated recently (block 911.). If not, the fan 17 is turned on for the abbreviated given period of time (block 908) and then turned off (block 907). If so, the output $V_{IRB}$ of the detector 311 is stored (block 901).

With reference to FIG. 10, the controller 40 includes a firmware 401 embedded in the PIC component 403 and an analog to digit converter 402. Other sensor control logic includes an emitter duty cycle timer that is coupled to the refrigerant detection sensor 30, an amplifier that is configured to amplify signals issued by the refrigerant detection system 30 and an A/D converter. The firmware 401 processes signals from the A/D converter and regulates a measurement timer, a measurement value (i.e. sample measurement), a reference measurement value and a reference timer. The sample measurement value and the reference measurement value are compared in hazard comparator 404 and an output of the hazard comparator 404, the reference timer value and a controller program of the PIC component 403 are computed and compared as referenced in FIG. 9, where two thresholds $\Delta VT$ and/or $\Delta VN$ are examined for actions or the system fan or the miniature fan associated with the sensor is turned on for the abbreviated given period of time (block 908) for updating VIRB. The reference timer is utilized to regulate whether the re-baselining is due while considering the most recent record of VIRB update triggered by either a leak event or simply the baseline update action. The overall logic can also include temperature compensation of the detector response based on an input from a temperature sensor disposed with the sensing device or attached to the FCU. An output of the OR gate unit 405 is then fed back into an AC system controller of the PIC component 403 as a feedback control feature. The AC system controller of the PIC component 403 provides the status of the system. This is so because when the system is operating in a cooling mode, the fan 17 operates such that leak detection remains in a standby status except for when the baseline update logic (block 911) is engaged if the reference timer determines the last update occurred more than a pre-determined interval (i.e., 1 month).

With the configurations described herein, the air conditioning system 10 and the refrigerant detection sensor 30 in particular will enable minimum but sufficient device configuration and functions, drift and degradation issues inherent to NDIR sensors overcome without sacrificing sufficient safety margins in the event of hazardous leaks occurring and an elimination of the need for sensor calibration.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An air conditioning system, comprising:
   a unit receptive of a refrigerant having a moderate-to-low global warming potential (GWP) value for thermal interaction with a fluid;
   an enclosure comprising a main section surrounding the unit and having a vent, an outlet and an inlet, an exhaust duct leading from the outlet to the vent and a return-air duct extending from the exhaust duct to the inlet;
   a fan disposed and configured for urging a flow of the fluid through the unit; and
   a refrigerant detection sensor disposed in the enclosure to be operable in a first mode in which a baseline response is established and a second mode in which refrigerant leak detection is executed based on the baseline response, wherein:
   the refrigerant detection sensor is further configured to generate a binary output of leak and non-leak signals in accordance with a result of the refrigerant leak detection, and
   the refrigerant detection sensor comprises firmware configured to communicate to a controller of the air conditioning system for operating the fan and for operating a damper of the vent based on the output.

2. The air conditioning system according to claim 1, wherein the refrigerant detection sensor is disposed proximate to a pooling region of the enclosure.

3. The air conditioning system according to claim 1, wherein an intermittent baseline calibration comprises establishing the baseline response of the refrigerant detection sensor to an execution of leak detection.

4. The air conditioning sensor according to claim 1, wherein the controller comprises a relay electrically interposed between the refrigerant detection sensor and the fan and the vent.

5. The air conditioning system according to claim 1, wherein the refrigerant detection sensor comprises a detection assembly and is receptive of a signal from the detection assembly and configured for generation of the binary output based on the signal and for issuance of the binary output to the controller.

6. The air conditioning system according to claim 5, wherein the refrigerant detection sensor comprises an analog-to-binary output conversion circuit.

7. The air conditioning system according to claim 5, wherein the detection assembly comprises:
   an emitter;
   a detector;
   an optical element to reflect radiation emitted by the emitter toward the detector such that the radiation passes through an elongate section of the enclosure while traveling from the emitter to the optical element and while traveling from the optical element to the detector; and
   a band pass filter disposed along a radiation pathway between the emitter and the detector.

8. The air conditioning system according to claim 7, wherein the detection assembly is configured to detect multiple types of the refrigerant.

9. The air conditioning system according to claim 7, wherein the detection assembly further comprises a flow driving element.

10. The air conditioning system according to claim 1, wherein the refrigerant detection sensor recalibrates at certain times and/or at predefined intervals.

11. The air conditioning system according to claim 10, wherein the refrigerant detection sensor executes diagnostics at the certain times and/or the predefined intervals.

12. The air conditioning sensor according to claim 1, wherein the leak detection comprises:
- an iterative determination that a concentration of the refrigerant in a sample drawn from the enclosure exceeds first or second thresholds defined in accordance with the most recent recalibration;
- a setting of the output to correspond to the leak signal in an event the concentration exceeds either of the first or second thresholds; and
- a setting of the output to correspond to the non-leak signal in an event the concentration does not exceed either of the first or second thresholds.

13. The air conditioning sensor according to claim 12, wherein the controller activates the fan for extended or abbreviated periods of time and opens the vent based on the discrete output corresponding to the leak signal and in the event the concentration exceeds either of the first or second thresholds, respectively, and deactivates the fan and closes the vent based on the binary output corresponding to the non-leak signal.

\* \* \* \* \*